(12) United States Patent
Huang et al.

(10) Patent No.: US 11,009,981 B2
(45) Date of Patent: May 18, 2021

(54) DRIVING METHOD OF TOUCH DISPLAY PANEL

(71) Applicant: Wuhan China Star Optoelectronics Technology Co., Ltd., Wuhan (CN)

(72) Inventors: Yaoli Huang, Wuhan (CN); Xinglong He, Wuhan (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 401 days.

(21) Appl. No.: 16/301,735

(22) PCT Filed: Sep. 22, 2018

(86) PCT No.: PCT/CN2018/107152
§ 371 (c)(1),
(2) Date: Nov. 15, 2018

(87) PCT Pub. No.: WO2020/019466
PCT Pub. Date: Jan. 30, 2020

(65) Prior Publication Data
US 2021/0117028 A1    Apr. 22, 2021

(30) Foreign Application Priority Data
Jul. 24, 2018  (CN) .......................... 201810821672.7

(51) Int. Cl.
*G06F 3/041*    (2006.01)
*G06F 3/047*    (2006.01)
(Continued)

(52) U.S. Cl.
CPC .......... *G06F 3/0412* (2013.01); *G06F 3/0445* (2019.05); *G06F 3/04166* (2019.05); *G09G 3/20* (2013.01); *G09G 2320/0242* (2013.01)

(58) Field of Classification Search
CPC ............... G06F 3/0416; G06F 3/04166; G06F 3/04164; G06F 3/044; G06F 3/047; G06F 3/0412; G06F 1/1643; G06F 3/0488
See application file for complete search history.

(56) References Cited

U.S. PATENT DOCUMENTS

2015/0145759 A1*  5/2015  Chen ..................... G09G 3/2003
                                                          345/88
2016/0267847 A1*  9/2016  Chen ..................... G09G 3/3225
(Continued)

FOREIGN PATENT DOCUMENTS

CN    107315500 A    11/2017
CN    108255350 A    7/2018
(Continued)

*Primary Examiner* — Md Saiful A Siddiqui
(74) *Attorney, Agent, or Firm* — Leong C. Lei (57) ABSTRACT

Provided is a driving method of a touch display panel. The driving method of the touch display panel drives the touch display panel with an indentation design. Common voltages are inputted to touch electrodes, and a common voltage inputted to the touch electrode with a larger area is smaller than a common voltage inputted to the touch electrode with a small area. Or, common voltages are inputted to the touch electrodes and data voltages are inputted to pixel electrodes, so that the data voltages of the pixel electrodes corresponding to the touch electrodes with the same area are the same when an area corresponding to pixel electrodes of the touch display panel displays an image with a same gray scale, a common voltage inputted to the touch electrode with a larger area is smaller than a common voltage inputted to the touch electrode with a small area.

5 Claims, 5 Drawing Sheets

(51) Int. Cl.
  *G06F 1/16* (2006.01)
  *G06F 3/044* (2006.01)
  *G09G 3/20* (2006.01)

(56) References Cited

U.S. PATENT DOCUMENTS

| | | | |
|---|---|---|---|
| 2017/0026553 A1 | 1/2017 | Lee et al. | |
| 2019/0033995 A1* | 1/2019 | Teramoto | G06F 3/0445 |
| 2019/0204982 A1* | 7/2019 | Peng | G06F 3/0416 |

FOREIGN PATENT DOCUMENTS

| | | |
|---|---|---|
| CN | 108984037 A | 12/2018 |
| KR | 20170051784 A | 5/2017 |

* cited by examiner

DRIVING METHOD OF TOUCH DISPLAY PANEL

FIELD OF THE INVENTION

The present invention relates to a display field, and more particularly to a driving method of a touch display panel.

BACKGROUND OF THE INVENTION

In the display skill field, the Liquid Crystal Display (LCD) and other panel displays have been gradually replaced the Cathode Ray Tube (CRT) displays. A liquid crystal display possesses advantages of being ultra thin, power saved and radiation free and has been widely utilized. Most of the liquid crystal displays on the present market are back light type liquid crystal display devices, which comprise a liquid crystal display panel and a back light module. Generally, the liquid crystal display panel comprises a Color Filter (CF) substrate, a Thin Film Transistor (TFT) substrate, Liquid Crystal (LC) sandwiched between the CF substrate and the TFT substrate and sealant. The working principle of the liquid crystal display panel is to locate liquid crystal molecules between two parallel glass substrates, and a plurality of vertical and horizontal tiny electrical wires are between the two glass substrates. The light of back light module is reflected to generate images by applying driving voltages to control whether the liquid crystal molecules to be changed directions.

Figure 1:
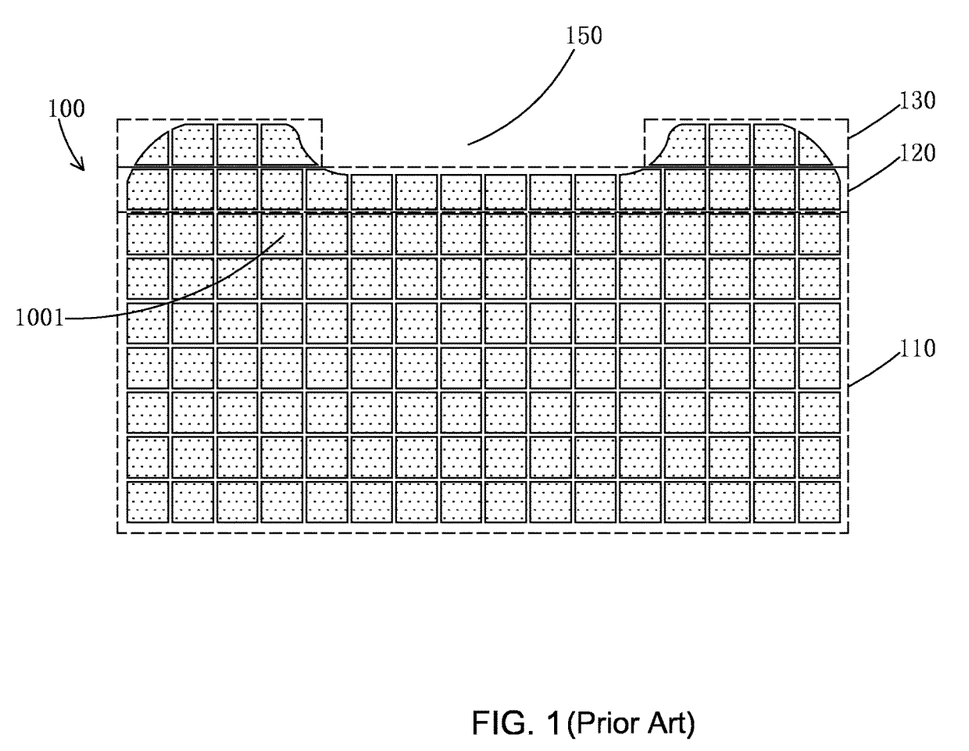
FIG. 1 is a structural diagram of a conventional touch display panel with an indentation design.

For having the touch function, more and more devices are equipped with a touch screen. According to the working principle of the touch screen, the touch screen can be divided into four types, namely, a resistive touch screen, a capacitive inductive touch screen, an infrared touch screen and a surface acoustic wave touch screen. For capacitive inductive touch screens, In-cell touch technology has become the mainstream in the touch field due to its low cost, low power consumption, thin thickness and multi-touch. In the existing liquid crystal display panel using the In-cell touch technology, the common electrode layer is formed to include a plurality of touch electrodes arranged with a similar array area, so that the common electrode layer is simultaneously used for providing a common voltage and for perform touch sensing. For realizing a full screen, a display panel with an indentation (notch) design is provided according to the prior art. The so-called notch design display panel refers to a hollowed out area at one end of the display panel for placing electronic components, thereby increasing the overall screen occupation ratio of the display panel. Please refer to FIG. 1, which is a touch display panel with an indentation (notch) design of the prior art includes a common electrode layer 100. The common electrode layer 100 comprises a first sub-electrode layer 110, a second sub-electrode layer 120 disposed at one side of the first sub-electrode layer 110 and two third sub-electrode layers 130 disposed at one side of the second sub-electrode layer 120 far from the first sub-electrode layer 110 and spaced apart from each other. The second sub-electrode layer 120 and the two third sub-electrode layers 130 enclose the indentation 150. The first sub-electrode layer 110, the second sub-electrode layer 120 and the two third sub-electrode layers 130 each comprise a plurality of touch electrodes 1001 arranged in an array, and an arrangement direction of the plurality of touch electrodes 1001 is same as an arrangement direction of the first sub-electrode layer 110 and the second sub-electrode layer 120. Areas of the plurality of touch electrodes 1001 in the first sub-electrode layer 110 are the same. An area of the touch electrodes 1001 opposite to the indentation 150 in the row of touch electrodes 1001 of the second sub-electrode layer 120, which are closest to the indentation 150, is smaller than the area of the touch electrode 1001 in the first sub-electrode layer 110. An area of the touch electrodes 1001 of the column in the third sub-electrode layer 130, which are closest to the indentation 150 is smaller than the area of the touch electrode 1001 in the first sub-electrode layer 110. The touch display panel has a notch design, so that the area of the touch electrodes 1001 surrounding the notch 150 is smaller than the area of the touch electrodes 1001 at other positions of the panel, and the area of the touch electrodes 1001 surrounding the notch 150 also are different, which results in a large difference in area between the different touch electrodes 1001 in the touch display panel. The touch display panel generally transmits the same common voltage to the plurality of touch electrodes 1001 during operation. The capacitance value of each touch electrode 1001 is determined by the area thereof. The larger the area is, the larger the capacitance is, and the larger the capacitance, the more severe the RC loading of the touch electrode 1001, which results in the larger RC loading difference for the respective touch electrodes 1001, so that the voltage values of the common voltages finally inputted to the respective touch electrodes 1001 are significantly different, and the touch display panel will have display chromatic aberration as displaying.

SUMMARY OF THE INVENTION

An objective of the present invention is to provide a driving method for a touch display panel, which can eliminate display chromatic aberration caused by area differences among different touch electrodes.

For realizing the aforesaid objective, the present invention first provides a driving method of a touch display panel, comprising:

Step S1, providing a touch display panel;

wherein the touch display panel comprises a common electrode layer; the common electrode layer comprises a first sub-electrode layer, a second sub-electrode layer disposed at one side of the first sub-electrode layer and two third sub-electrode layers disposed at one side of the second sub-electrode layer far from the first sub-electrode layer and spaced apart from each other; the second sub-electrode layer and the two third sub-electrode layers enclose an indentation; the first sub-electrode layer, the second sub-electrode layer and the two third sub-electrode layers each comprise a plurality of touch electrodes arranged in an array, and an arrangement direction of the plurality of touch electrodes is same as an arrangement direction of the first sub-electrode layer and the second sub-electrode layer; areas of the plurality of touch electrodes in the first sub-electrode layer are the same; an area of the touch electrodes opposite to the indentation in the row of touch electrodes of the second sub-electrode layer, which are closest to the indentation, is smaller than the area of the touch electrode in the first sub-electrode layer; an area of the touch electrodes of the column in the third sub-electrode layer, which are closest to the indentation is smaller than the area of the touch electrode in the first sub-electrode layer;

Step S2, inputting common voltages to the plurality of touch electrodes, so that the common voltages of the touch electrodes with the same area are the same, wherein in the touch electrodes with different areas, a common voltage inputted to the touch electrode with a larger area is smaller than a common voltage inputted to the touch electrode with a small area to drive the touch display panel.

A portion at an edge of the third sub-electrode layer close to the indentation and a portion at an edge of the second sub-electrode layer close to the indentation corresponding to the indentation are sequentially extended to form a rounded corner; the edge of the third sub-electrode layer close to the indentation and an edge of the third sub-electrode layer far from the second sub-electrode layer are sequentially extended to form a rounded corner.

Columns of touch electrodes of the two third sub-electrode layers that are farthest from the indentation respectively correspond to outermost two columns of touch electrodes of the second sub-electrode layer;

the edge of the third sub-electrode layer far from the second sub-electrode layer, an edge of the third sub-electrode layer far from indentation and one of two side edges of the second sub-electrode layer close to the third sub-electrode layer are sequentially extended to form a rounded corner.

The second sub-electrode layer comprises a row of touch electrodes, and a number of the touch electrodes in the second sub-electrode layer is equal to a number of columns of the touch electrodes in the first sub-electrode layer; the two third sub-electrode layers each comprise a row of touch electrodes;

an area of the touch electrode farthest from the indentation in the third sub-electrode layer is smaller than an area of the touch electrode closest to the indentation in the third sub-electrode layer, and the area of the touch electrode closest to the indentation in the third sub-electrode layer is smaller than an area of the touch electrode adjacent to the touch electrode farthest from the indentation in the third sub-electrode layer, and the area of the touch electrode adjacent to the touch electrode farthest from the indentation in the third sub-electrode layer is equal to an area of one of outermost two touch electrodes of the second sub-electrode layer close to the third sub-electrode layers, and is smaller the area of the touch electrode of the first sub-electrode layer;

in the touch electrodes of the second sub-electrode layer opposite to the indentation, the areas of the outermost two touch electrodes are equal, and areas of the touch electrodes except the outermost two touch electrodes are equal, and the areas of the outermost two touch electrodes are larger than the areas of the touch electrodes except the outermost two touch electrodes.

In the third sub-electrode layer, the areas of all the touch electrodes except the touch electrodes farthest from the indentation, the touch electrodes closest to the indentation and the touch electrodes adjacent to the touch electrodes farthest from the indentation are equal to the areas of the touch electrodes of the first sub-electrode layer;

in the second sub-electrode layer, areas of the touch electrodes except the outermost two touch electrodes and the touch electrodes opposite to the indentation are equal to the areas of the touch electrodes in the first sub-electrode layer.

The present invention further provides a driving method of a touch display panel, comprising:

Step S1', providing a touch display panel;

wherein the touch display panel comprises a common electrode layer and a pixel electrode layer disposed opposite to the common electrode layer; the common electrode layer comprises a first sub-electrode layer, a second sub-electrode layer disposed at one side of the first sub-electrode layer and two third sub-electrode layers disposed at one side of the second sub-electrode layer far from the first sub-electrode layer and spaced apart from each other; the second sub-electrode layer and the two third sub-electrode layers enclose an indentation; the first sub-electrode layer, the second sub-electrode layer and the two third sub-electrode layers each comprise a plurality of touch electrodes arranged in an array, and an arrangement direction of the plurality of touch electrodes is same as an arrangement direction of the first sub-electrode layer and the second sub-electrode layer; areas of the plurality of touch electrodes in the first sub-electrode layer are the same; an area of the touch electrodes opposite to the indentation in the row of touch electrodes of the second sub-electrode layer, which are closest to the indentation, is smaller than the area of the touch electrode in the first sub-electrode layer; an area of the touch electrodes of the column in the third sub-electrode layer, which are closest to the indentation is smaller than the area of the touch electrode in the first sub-electrode layer;

Step S2', inputting common voltages to the plurality of touch electrodes, and inputting data voltages to the plurality of pixel electrodes, so that the data voltages of the pixel electrodes corresponding to the touch electrodes with the same area are the same when an area corresponding to pixel electrodes of the touch display panel displays an image with a same gray scale, wherein in the touch electrodes with different areas, a data voltage inputted to the pixel electrode corresponding to the touch electrode with a larger area is smaller than a data voltage inputted to the pixel electrode corresponding to the touch electrode with a small area to drive the touch display panel.

A portion at an edge of the third sub-electrode layer close to the indentation and a portion at an edge of the second sub-electrode layer close to the indentation corresponding to the indentation are sequentially extended to form a rounded corner; the edge of the third sub-electrode layer close to the indentation and an edge of the third sub-electrode layer far from the second sub-electrode layer are sequentially extended to form a rounded corner.

Columns of touch electrodes of the two third sub-electrode layers that are farthest from the indentation respectively correspond to outermost two columns of touch electrodes of the second sub-electrode layer;

the edge of the third sub-electrode layer far from the second sub-electrode layer, an edge of the third sub-electrode layer far from indentation and one of two side edges of the second sub-electrode layer close to the third sub-electrode layer are sequentially extended to form a rounded corner.

The second sub-electrode layer comprises a row of touch electrodes, and a number of the touch electrodes in the second sub-electrode layer is equal to a number of columns of the touch electrodes in the first sub-electrode layer; the two third sub-electrode layers each comprise a row of touch electrodes;

an area of the touch electrode farthest from the indentation in the third sub-electrode layer is smaller than an area of the touch electrode closest to the indentation in the third sub-electrode layer, and the area of the touch electrode closest to the indentation in the third sub-electrode layer is smaller than an area of the touch electrode adjacent to the touch electrode farthest from the indentation in the third sub-electrode layer, and the area of the touch electrode adjacent to the touch electrode farthest from the indentation in the third sub-electrode layer is equal to an area of one of outermost two touch electrodes of the second sub-electrode layer close to the third sub-electrode layers, and is smaller the area of the touch electrode of the first sub-electrode layer;

in the touch electrodes of the second sub-electrode layer opposite to the indentation, the areas of the outermost two touch electrodes are equal, and areas of the touch electrodes except the outermost two touch electrodes are equal, and the areas of the outermost two touch electrodes are larger than the areas of the touch electrodes except the outermost two touch electrodes.

In the third sub-electrode layer, the areas of all the touch electrodes except the touch electrodes farthest from the indentation, the touch electrodes closest to the indentation and the touch electrodes adjacent to the touch electrodes farthest from the indentation are equal to the areas of the touch electrodes of the first sub-electrode layer;

in the second sub-electrode layer, areas of the touch electrodes except the outermost two touch electrodes and the touch electrodes opposite to the indentation are equal to the areas of the touch electrodes in the first sub-electrode layer.

The benefits of the present invention are: the driving method of the touch display panel is used to drive the touch display panel with an indentation design. When driving, common voltages are inputted to a plurality of touch electrodes, a common voltage inputted to the touch electrode with a larger area is smaller than a common voltage inputted to the touch electrode with a small area in the touch electrodes with different areas. Or, common voltages are inputted to the plurality of touch electrodes, and data voltages are inputted to the plurality of pixel electrodes, so that the data voltages of the pixel electrodes corresponding to the touch electrodes with the same area are the same when an area corresponding to pixel electrodes of the touch display panel displays an image with a same gray scale, wherein in the touch electrodes with different areas, a common voltage inputted to the touch electrode with a larger area is smaller than a common voltage inputted to the touch electrode with a small area. Therefore, it is possible to eliminate the display chromatic aberration caused by the area differences of the touch electrodes due to the indentation design of the touch display panel.

BRIEF DESCRIPTION OF THE DRAWINGS

In order to better understand the characteristics and technical aspect of the invention, please refer to the following detailed description and accompanying drawings of the present invention. However, the drawings are provided for reference only and are not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 2:
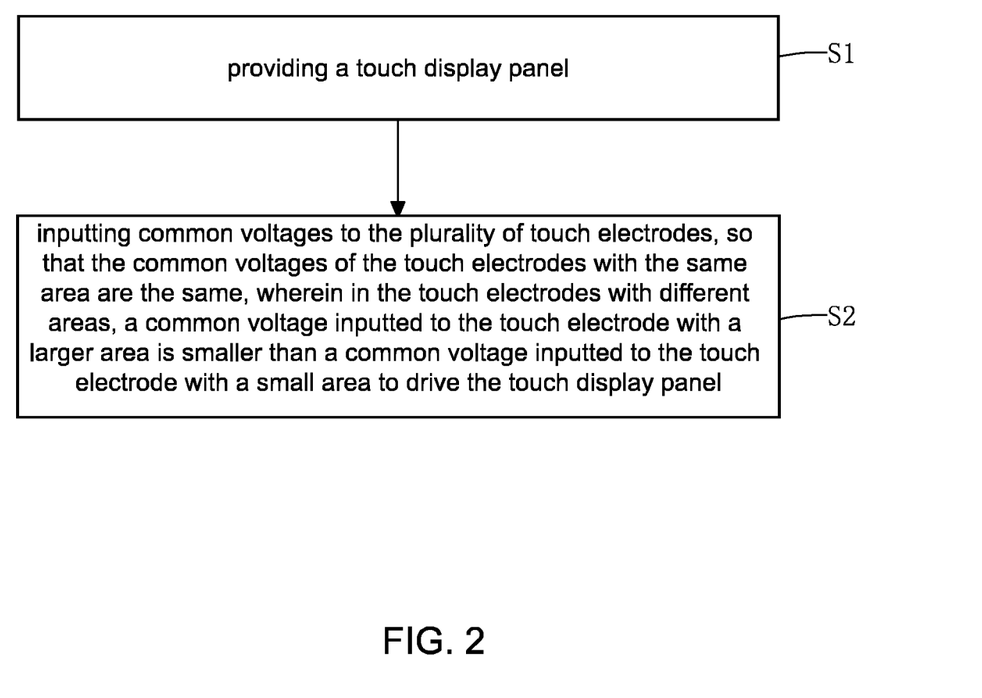
FIG. 2 is a flowchart of the first embodiment of a driving method of a touch display panel according to the present invention.
Figure 4:
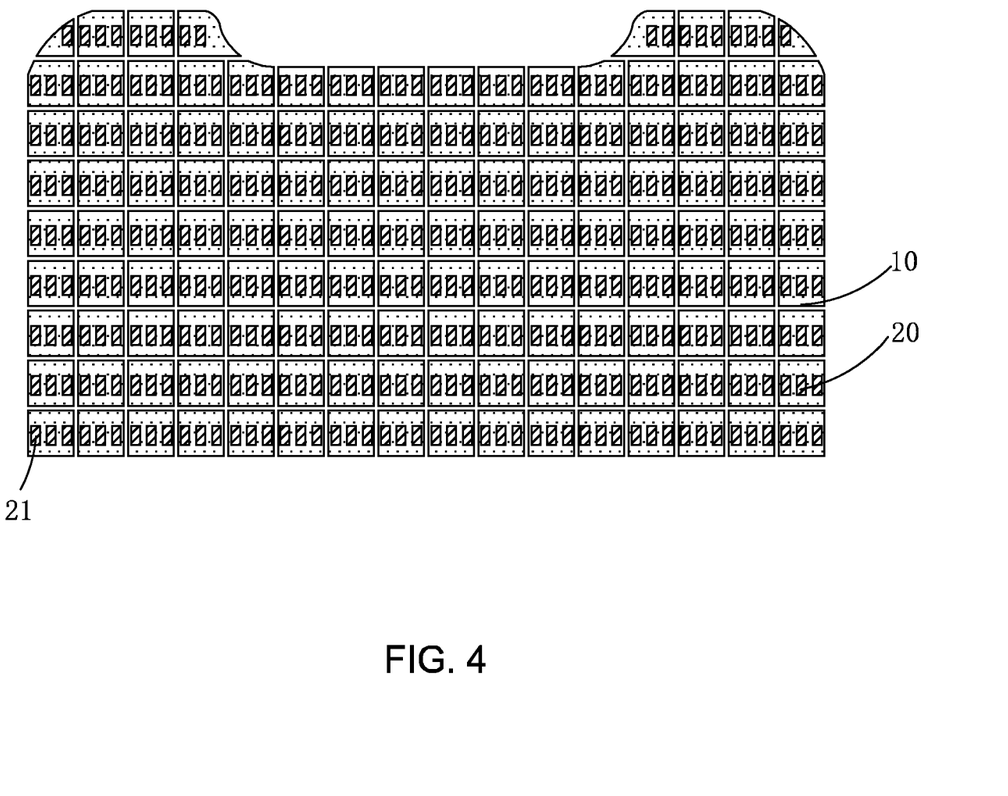
FIG. 4 and FIG. 5 are diagrams of Step S1 of the first embodiment and the second embodiment of the driving method of the touch display panel according to the present invention.
Figure 5:
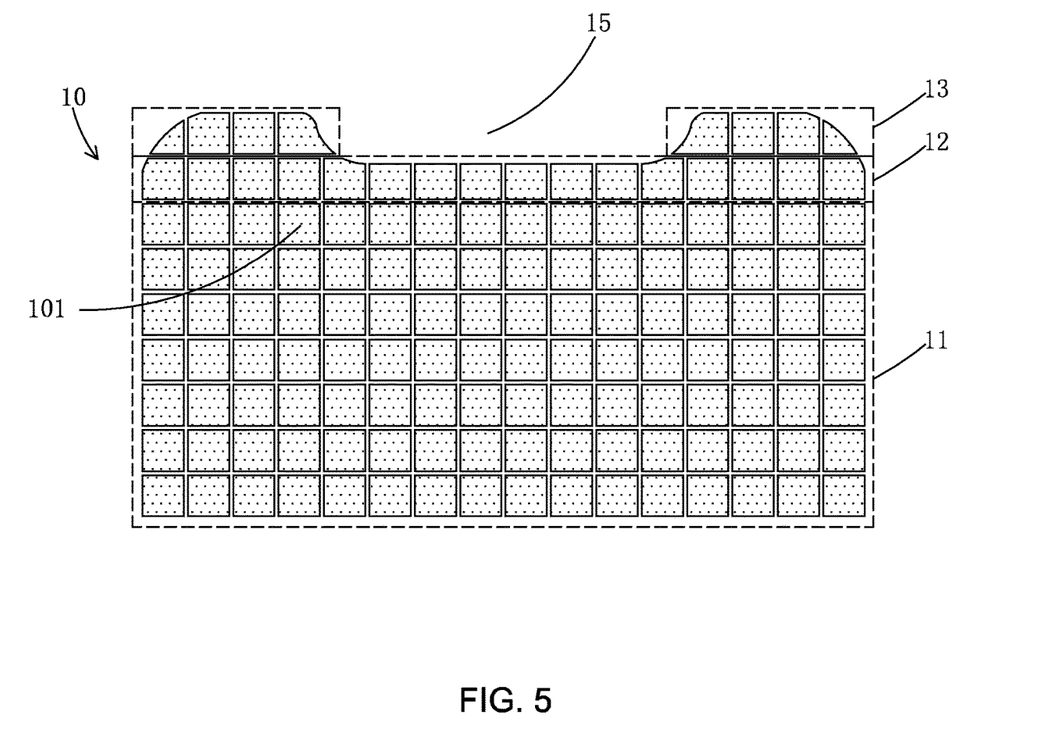

Please refer to FIG. 2. The first embodiment of a driving method of a touch display panel according to the present invention comprises steps of:

Step S1, referring to FIG. 4 and FIG. 5, a touch display panel with an indentation design is provided. The touch display panel comprises a common electrode layer 10. The common electrode layer 10 comprises a first sub-electrode layer 11, a second sub-electrode layer 12 disposed at one side of the first sub-electrode layer 11 and two third sub-electrode layers 13 disposed at one side of the second sub-electrode layer 12 far from the first sub-electrode layer 11 and spaced apart from each other. The second sub-electrode layer 12 and the two third sub-electrode layers 13 enclose the indentation 15. The first sub-electrode layer 11, the second sub-electrode layer 12 and the two third sub-electrode layers 13 each comprise a plurality of touch electrodes 101 arranged in an array, and an arrangement direction of the plurality of touch electrodes 101 is same as an arrangement direction of the first sub-electrode layer 11 and the second sub-electrode layer 12. Areas of the plurality of touch electrodes 101 in the first sub-electrode layer 11 are the same. An area of the touch electrodes 101 opposite to the indentation 15 in the row of touch electrodes 101 of the second sub-electrode layer 12, which are closest to the indentation 15, is smaller than the area of the touch electrode 101 in the first sub-electrode layer 11. An area of the touch electrodes 101 of the column in the third sub-electrode layer 13, which are closest to the indentation 15 is smaller than the area of the touch electrode 101 in the first sub-electrode layer 11.

Specifically, referring to FIG. 4, the touch display panel further comprises a pixel electrode layer 20 disposed opposite to the common electrode layer 10. The pixel electrode layer 20 comprises a plurality of sets of pixel electrodes 21 respectively corresponding to the plurality of touch electrodes 101, and an area corresponding to pixel electrodes 21 of the touch display panel is formed with a plurality of sub-pixels.

Specifically, as shown in the embodiment of FIG. 5, a portion at an edge of the third sub-electrode layer 13 close to the indentation 15 and a portion at an edge of the second sub-electrode layer 12 close to the indentation 15 corresponding to the indentation 15 are sequentially extended to form a rounded corner. The edge of the third sub-electrode layer 13 close to the indentation 15 and an edge of the third sub-electrode layer far from the second sub-electrode layer 12 are sequentially extended to form a rounded corner. Columns of touch electrodes 101 of the two third sub-electrode layers 13 that are farthest from the indentation 15 respectively correspond to outermost two columns of touch electrodes 101 of the second sub-electrode layer 12. The edge of the third sub-electrode layer 13 far from the second sub-electrode layer 12, an edge of the third sub-electrode layer far from indentation 15 and one of two side edges of the second sub-electrode layer 12 close to the third sub-electrode layer 13 are sequentially extended to form a rounded corner.

Specifically, in the embodiment shown in FIG. 5, the second sub-electrode layer 12 comprises a row of touch electrodes 101, and a number of the touch electrodes 101 in the second sub-electrode layer 12 is equal to a number of columns of the touch electrodes 101 in the first sub-electrode layer 11. The two third sub-electrode layers 13 each comprise a row of touch electrodes 101. An area of the touch electrode 101 farthest from the indentation 15 in the third sub-electrode layer 13 is smaller than an area of the touch electrode 101 closest to the indentation 15 in the third sub-electrode layer 13, and the area of the touch electrode 101 closest to the indentation 15 in the third sub-electrode layer 13 is smaller than an area of the touch electrode 101 adjacent to the touch electrode 101 farthest from the indentation 15 in the third sub-electrode layer 13, and the area of the touch electrode 101 adjacent to the touch electrode 101 farthest from the indentation 15 in the third sub-electrode layer 13 is equal to an area of one of outermost two touch electrodes 101 of the second sub-electrode layer 12 close to the third sub-electrode layers 13, and is smaller the area of the touch electrode 101 of the first sub-electrode layer 11. In the third sub-electrode layer 13, the areas of all the touch electrodes 101 except the touch electrodes 101 farthest from the indentation 15, the touch electrodes 101 closest to the indentation 15 and the touch electrodes 101 adjacent to the touch electrodes 101 farthest from the indentation 15 are equal to the areas of the touch electrodes 101 of the first sub-electrode layer 101.

Preferably, in the embodiment shown in FIG. 5, the area of the touch electrode 101 farthest from the indentation 15 in the third sub-electrode layer 13 is 50% of the area of the touch electrode 101 of the first sub-electrode layer 11. The area of the touch electrode 101 closest to the indentation 15 in the third sub-electrode layer 13 is 90% of the area of the touch electrode 101 of the first sub-electrode layer 11. The area of the touch electrode 101 adjacent to the touch electrode 101 farthest from the indentation 15 in the third sub-electrode layer 13 is 95% of the area of the touch electrode 101 of the first sub-electrode layer 11. The areas of outermost two touch electrodes 101 of the second sub-electrode layer 12 both are 95% of the area of the touch electrode 101 of the first sub-electrode layer 11.

Specifically, in the embodiment shown in FIG. 5, in the touch electrodes 101 of the second sub-electrode layer 12 opposite to the indentation 15, the areas of the outermost two touch electrodes 101 are equal. Areas of other touch electrodes 101 except the outermost two touch electrodes 101 are equal. The areas of the outermost two touch electrodes 101 are larger than the areas of other touch electrodes 101 except the outermost two touch electrodes 101. In the second sub-electrode layer 12, areas of the touch electrodes 101 except the outermost two touch electrodes 101 and the touch electrodes 101 opposite to the indentation 15 are equal to the areas of the touch electrodes 101 in the first sub-electrode layer 101.

Preferably, in the embodiment shown in FIG. 5, in the touch electrodes 101 of the second sub-electrode layer 12 opposite to the indentation 15, the areas of the outermost two touch electrodes 101 are 88% of the area of the touch electrode 101 of the first sub-electrode layer 11. The areas of other touch electrodes 101 except the outermost two touch electrodes 101 are 80% of the area of the touch electrode 101 of the first sub-electrode layer 11.

Step S2, inputting common voltages to the plurality of touch electrodes 101, so that the common voltages of the touch electrodes 101 with the same area are the same, wherein in the touch electrodes 101 with different areas, a common voltage inputted to the touch electrode 101 with a larger area is smaller than a common voltage inputted to the touch electrode 101 with a small area to drive the touch display panel.

Specifically, in Step S2, while the common voltages are inputted to the plurality of touch electrodes 101, corresponding data voltages are further inputted to the plurality of pixel electrodes 21.

Specifically, in Step S2, the difference between the common voltage inputted to the touch electrode 101 with a large area and the common voltage inputted to the touch electrode 101 with a small area can be set according to actual product requirements, so as to minimize the area chromatic aberration of the touch electrodes 101 corresponding to different areas of the touch display panel. For instance, the common voltage inputted to the touch electrode 101 in the first sub-electrode layer 11 is −0.23V, and the common voltage inputted to the touch electrode 101 of the third sub-electrode layer 13 farthest from the indentation 15 is −0.17V, and the common voltage inputted to the touch electrode 101 closest to the indentation 15 in the third sub-electrode layer 13 is −0.21V, and the common voltage inputted to the touch electrode 101 adjacent to the touch electrode 101 farthest from the indentation 15 in the third sub-electrode layer 13 is −0.22V, and the common voltage inputted to the outermost two touch electrodes 101 of the second sub-electrode layer 12 is −0.22V. In the touch electrodes 101 of the second sub-electrode layer 12 opposite to the recess 15, the common voltage inputted to the outermost two touch electrodes 101 is −0.2 V, the common voltage inputted to the touch electrodes 101 except the outermost two touch electrodes 101 is −0.19V.

Specifically, the first embodiment of the driving method of the touch display panel of the present invention drives the touch display panel with an indentation design. When driving, common voltages are inputted to the plurality of touch electrodes 101, so that the common voltages of the touch electrodes 101 with the same area are the same, wherein in the touch electrodes 101 with different areas, a common voltage inputted to the touch electrode 101 with a larger area is smaller than a common voltage inputted to the touch electrode 101 with a small area to drive the touch display panel. Therefore, the difference in the resistance loadings between the touch electrodes 101 with different areas can be compensated, so that the common voltages finally received by the touch electrodes 101 of different areas tend to be consistent. Accordingly, the display chromatic aberration between the different areas corresponding to the touch electrodes 101 of different areas is greatly reduced when the touch display panel is displayed to eliminate the display chromatic aberration caused by the area difference of the touch electrodes 101 due to the indentation (notch) design.

Figure 3:
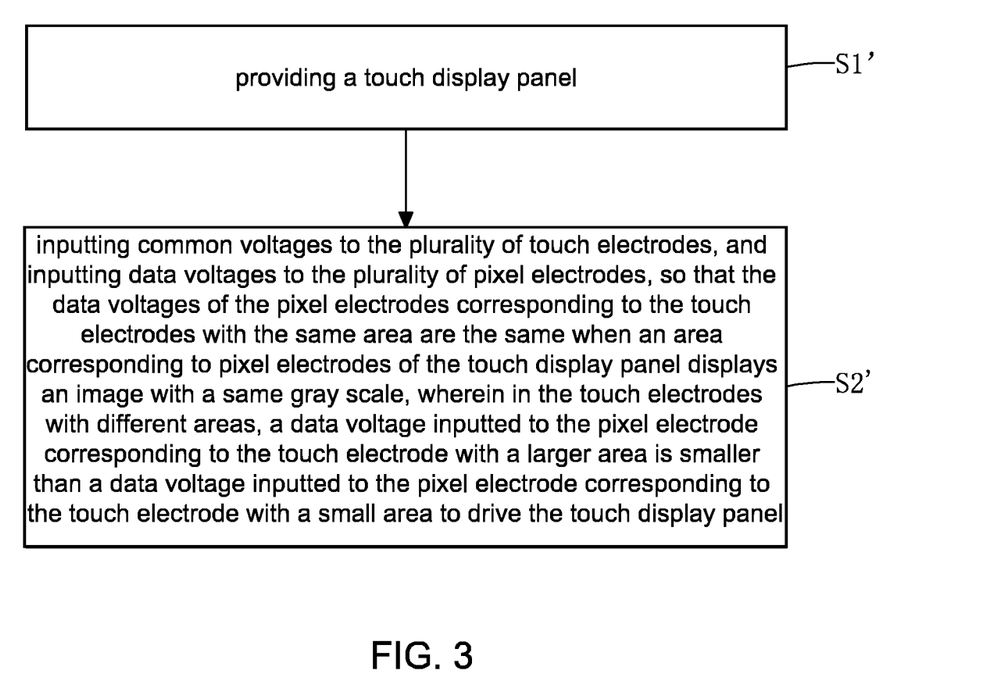
FIG. 3 is a flowchart of the second embodiment of a driving method of a touch display panel according to the present invention.

Referring to FIG. 3 in combination with FIG. 4 and FIG. 5, the difference of the second embodiment of the driving method of the touch display panel of the present invention from the aforesaid first embodiment in that:

In Step S2', common voltages are inputted to the plurality of touch electrodes 101, and data voltages are inputted to the plurality of pixel electrodes 21, so that the data voltages of the pixel electrodes 21 corresponding to the touch electrodes 101 with the same area are the same when an area corresponding to pixel electrodes 21 of the touch display panel displays an image with a same gray scale, wherein in the touch electrodes 101 with different areas, a data voltage inputted to the pixel electrode 21 corresponding to the touch electrode 101 with a larger area is smaller than a data voltage inputted to the pixel electrode 21 corresponding to the touch electrode 101 with a small area to drive the touch display panel.

Specifically, in Step S2', the display data received by the areas of the touch display panel corresponding to the touch electrodes 101 of different areas can be processed by using different gamma curves to adjust the voltage values of the data voltages inputted to the respective pixel electrodes 21. Thus, when an area corresponding to pixel electrodes 21 of the touch display panel displays an image with a same gray scale, in the touch electrodes 101 with different areas, a data voltage inputted to the pixel electrode 21 corresponding to the touch electrode 101 with a larger area is smaller than a data voltage inputted to the pixel electrode 21 corresponding to the touch electrode 101 with a small area.

Specifically, in Step S2', the data voltages are inputted to the plurality of pixel electrodes 21, so that when an area corresponding to pixel electrodes 21 of the touch display panel displays an image with 255 gray scale, the data voltage inputted to the pixel electrode 21 corresponding to the touch electrode 101 in the first sub-electrode layer 11 is 5.3V, and the data voltage inputted to the pixel electrode 21 corresponding to the touch electrode 101 of the third sub-electrode layer 13 farthest from the indentation 15 is 4.7V, and the data voltage inputted to the pixel electrode 21 corresponding to the touch electrode 101 closest to the indentation 15 in the third sub-electrode layer 13 is 5.1V, and the data voltage inputted to the pixel electrode 21 corresponding to the touch electrode 101 adjacent to the touch electrode 101 farthest from the indentation 15 in the third sub-electrode layer 13 is 5.2V, and the data voltage inputted to the pixel electrode 21 corresponding to the outermost two touch electrodes 101 in the second sub-electrode layer 12 is 5.2V. In the touch electrodes 101 of the second sub-electrode layer 12 opposite to the recess 15, the common voltage inputted to the outermost two touch electrodes 101 is −0.2 V, the common voltage inputted to the touch electrodes 101 except the outermost two touch electrodes 101 is −0.19V.

Specifically, the second embodiment of the driving method of the touch display panel of the present invention drives the touch display panel with an indentation design. When driving, common voltages are inputted to the plurality of touch electrodes 101, and meanwhile, data voltages are inputted to the plurality of pixel electrodes 21, so that by adjusting the data voltages, when an area corresponding to pixel electrodes 21 of the touch display panel displays an image with a same gray scale, in the touch electrodes 101 with different areas, a data voltage inputted to the pixel electrode 21 corresponding to the touch electrode 101 with a larger area is smaller than a data voltage inputted to the pixel electrode 21 corresponding to the touch electrode 101 with a small area. Therefore, the difference in the resistance loadings between the touch electrodes 101 with different areas can be compensated. Accordingly, the display chromatic aberration between the different areas corresponding to the touch electrodes 101 of different areas is greatly reduced when the touch display panel is displayed to eliminate the display chromatic aberration caused by the area difference of the touch electrodes 101 due to the indentation (notch) design.

In conclusion, the driving method of the touch display panel is used to drive the touch display panel with an indentation design. When driving, common voltages are inputted to a plurality of touch electrodes, a common voltage inputted to the touch electrode with a larger area is smaller than a common voltage inputted to the touch electrode with a small area in the touch electrodes with different areas. Or, common voltages are inputted to the plurality of touch electrodes, and data voltages are inputted to the plurality of pixel electrodes, so that the data voltages of the pixel electrodes corresponding to the touch electrodes with the same area are the same when an area corresponding to pixel electrodes of the touch display panel displays an image with a same gray scale, wherein in the touch electrodes with different areas, a common voltage inputted to the touch electrode with a larger area is smaller than a common voltage inputted to the touch electrode with a small area. Therefore, it is possible to eliminate the display chromatic aberration caused by the area differences of the touch electrodes due to the indentation design of the touch display panel.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A driving method of a touch display panel, comprising:
Step S1', providing a touch display panel;
wherein the touch display panel comprises a common electrode layer and a pixel electrode layer disposed above the common electrode layer; the common electrode layer comprises a first sub-electrode layer, a second sub-electrode layer disposed at one side of the first sub-electrode layer and two third sub-electrode layers disposed at one side of the second sub-electrode layer far from the first sub-electrode layer and spaced apart from each other; the second sub-electrode layer and the two third sub-electrode layers enclose an indentation; the first sub-electrode layer, the second sub-electrode layer and the two third sub-electrode layers each comprise a plurality of touch electrodes arranged in an array, and an arrangement direction of the plurality of touch electrodes is same as an arrangement direction of the first sub-electrode layer and the second sub-electrode layer; areas of the plurality of touch electrodes in the first sub-electrode layer are the same; an area of the touch electrodes opposite to the indentation in the row of touch electrodes of the second sub-electrode layer, which are closest to the indentation, is smaller than the area of the touch electrode in the first sub-electrode layer; an area of the touch electrodes of the column in the third sub-electrode layer, which are closest to the indentation is smaller than the area of the touch electrode in the first sub-electrode layer; the pixel electrode layer comprises a plurality of pixel electrodes respectively corresponding to the plurality of touch electrodes and all the pixel electrodes are the same size;
Step S2', inputting common voltages to the plurality of touch electrodes, and inputting data voltages to the plurality of pixel electrodes of the same size, so that the data voltages of the pixel electrodes corresponding to the touch electrodes with the same area are the same when an area corresponding to pixel electrodes of the touch display panel displays an image with a same gray scale, wherein in the touch electrodes with different areas, a data voltage inputted to the pixel electrode of the same size corresponding to the touch electrode with a larger area is smaller than a data voltage inputted to the pixel electrode of the same size corresponding to the touch electrode with a small area to drive the touch display panel to compensate difference in resistance loadings between the touch electrodes with different areas for reducing display chromatic aberration between the different areas corresponding to the touch electrodes of different areas for the touch display panel having the indentation enclosed by the second sub-electrode layer and the two third sub-electrode layers.

2. The driving method of the touch display panel according to claim 1, wherein a portion at an edge of the third sub-electrode layer close to the indentation and a portion at an edge of the second sub-electrode layer close to the indentation corresponding to the indentation are sequentially extended to form a rounded corner; the edge of the third sub-electrode layer close to the indentation and an edge of the third sub-electrode layer far from the second sub-electrode layer are sequentially extended to form a rounded corner.

3. The driving method of the touch display panel according to claim 2, wherein columns of touch electrodes of the two third sub-electrode layers that are farthest from the indentation respectively correspond to outermost two columns of touch electrodes of the second sub-electrode layer; the edge of the third sub-electrode layer far from the second sub-electrode layer, an edge of the third sub-electrode layer far from indentation and one of two side edges of the second sub-electrode layer close to the third sub-electrode layer are sequentially extended to form a rounded corner.

4. The driving method of the touch display panel according to claim 3, wherein the second sub-electrode layer comprises a row of touch electrodes, and a number of the touch electrodes in the second sub-electrode layer is equal to a number of columns of the touch electrodes in the first sub-electrode layer; the two third sub-electrode layers each comprise a row of touch electrodes;

an area of the touch electrode farthest from the indentation in the third sub-electrode layer is smaller than an area of the touch electrode closest to the indentation in the third sub-electrode layer, and the area of the touch electrode closest to the indentation in the third sub-electrode layer is smaller than an area of the touch electrode adjacent to the touch electrode farthest from the indentation in the third sub-electrode layer, and the area of the touch electrode adjacent to the touch electrode farthest from the indentation in the third sub-electrode layer is equal to an area of one of outermost two touch electrodes of the second sub-electrode layer close to the third sub-electrode layers, and is smaller the area of the touch electrode of the first sub-electrode layer;

in the touch electrodes of the second sub-electrode layer opposite to the indentation, the areas of the outermost two touch electrodes are equal, and areas of the touch electrodes except the outermost two touch electrodes are equal, and the areas of the outermost two touch electrodes are larger than the areas of the touch electrodes except the outermost two touch electrodes.

5. The driving method of the touch display panel according to claim 4, wherein in the third sub-electrode layer, the areas of all the touch electrodes except the touch electrodes farthest from the indentation, the touch electrodes closest to the indentation and the touch electrodes adjacent to the touch electrodes farthest from the indentation are equal to the areas of the touch electrodes of the first sub-electrode layer;

in the second sub-electrode layer, areas of the touch electrodes except the outermost two touch electrodes and the touch electrodes opposite to the indentation are equal to the areas of the touch electrodes in the first sub-electrode layer.

* * * * *